(12) United States Patent
Ashrafi

(10) Patent No.: US 9,424,509 B2
(45) Date of Patent: Aug. 23, 2016

(54) SYSTEM FOR APPLICATION PERSONALIZATION FOR A MOBILE DEVICE

(75) Inventor: Solyman Ashrafi, Plano, TX (US)

(73) Assignee: T-MOBILE USA, INC., Bellevue, WA (US)

( * ) Notice: Subject to any disclaimer, the term of this patent is extended or adjusted under 35 U.S.C. 154(b) by 210 days.

(21) Appl. No.: 13/044,229

(22) Filed: Mar. 9, 2011

(65) Prior Publication Data

US 2012/0233103 A1   Sep. 13, 2012

(51) Int. Cl.
*G06N 3/02* (2006.01)
*G06N 7/02* (2006.01)
*G06N 3/04* (2006.01)
*G06F 9/44* (2006.01)

(52) U.S. Cl.
CPC ............... *G06N 3/0436* (2013.01); *G06F 8/71* (2013.01)

(58) Field of Classification Search
USPC .......................................................... 706/15
See application file for complete search history.

(56) References Cited

U.S. PATENT DOCUMENTS

| | | | |
|---|---|---|---|
| 5,867,799 A * | 2/1999 | Lang ................. | G06F 17/30702 |
| 5,943,619 A | 8/1999 | Coyne et al. | |
| 6,199,067 B1 * | 3/2001 | Geller ............... | G06F 17/30702 |
| RE38,267 E | 10/2003 | Borkowski et al. | |
| 6,871,186 B1 | 3/2005 | Tuzhilin et al. | |
| 6,985,723 B2 | 1/2006 | Kil | |
| 7,069,026 B2 | 6/2006 | McClure | |
| 7,181,500 B2 * | 2/2007 | Jen ........................... | H04L 29/06 707/999.003 |
| 7,200,383 B2 | 4/2007 | Eronen | |
| 7,224,987 B1 | 5/2007 | Bhela et al. | |
| 7,243,105 B2 * | 7/2007 | Thint ................. | G06F 17/30867 |
| 7,266,395 B2 | 9/2007 | Schnurr | |
| 7,289,793 B2 | 10/2007 | Norwood et al. | |
| 7,640,008 B2 | 12/2009 | Gallagher et al. | |
| 7,653,392 B2 | 1/2010 | Ovadia et al. | |
| 7,734,680 B1 * | 6/2010 | Kurapati ........... | G06F 17/30035 709/203 |
| 7,813,822 B1 * | 10/2010 | Hoffberg ........... | G06K 9/00369 381/73.1 |
| 7,831,529 B2 | 11/2010 | Horvitz et al. | |
| 7,865,841 B2 | 1/2011 | Morikawa | |

(Continued)

FOREIGN PATENT DOCUMENTS

EP   1971118 A1   9/2008
EP   1978454 A1   10/2008

(Continued)

OTHER PUBLICATIONS

Nilton Bila, "Mobile user Profile Acquisition Through Network Observables and Explicit User Queries", 2008. http://ect.bell-labs.com/who/tkh/publications/papers/inamdm.pdf.

(Continued)

*Primary Examiner* — Kakali Chaki
*Assistant Examiner* — Fuming Wu
(74) *Attorney, Agent, or Firm* — Howison & Arnott, LLP

(57) ABSTRACT

A system for controlling applications of a wireless mobile device includes a server for receiving data related to an adaptive user profile and for controlling operations of applications within the wireless mobile device. An adaptive neural/fuzzy logic control application implemented within the network server generates the adaptive user profile responsive to the received data. The adaptive user profile controls operations of the applications within the wireless mobile device and changes in real time responsive to the received data.

20 Claims, 4 Drawing Sheets

(56) References Cited

U.S. PATENT DOCUMENTS

| | | | |
|---|---|---|---|
| 7,974,714 B2* | 7/2011 | Hoffberg | G06K 9/00369 360/75 |
| 8,280,957 B2* | 10/2012 | Wu | H04M 3/42365 709/204 |
| 2002/0160745 A1 | 10/2002 | Wang | |
| 2003/0060896 A9* | 3/2003 | Hulai | G06F 9/4443 700/1 |
| 2003/0065670 A1 | 4/2003 | Bisson et al. | |
| 2003/0098892 A1* | 5/2003 | Hiipakka | G06F 3/0481 715/846 |
| 2003/0110503 A1 | 6/2003 | Perkes | |
| 2004/0128301 A1 | 7/2004 | Thint et al. | |
| 2004/0260565 A1* | 12/2004 | Zimniewicz | G06Q 30/02 713/1 |
| 2004/0267941 A1* | 12/2004 | Hodges | G06Q 30/02 709/228 |
| 2005/0153691 A1 | 7/2005 | Xue et al. | |
| 2006/0079224 A1 | 4/2006 | Welnick et al. | |
| 2006/0143646 A1* | 6/2006 | Wu | H04M 3/42365 725/10 |
| 2006/0167977 A1* | 7/2006 | Wu | H04L 29/06 709/203 |
| 2006/0291481 A1* | 12/2006 | Kumar | H04L 29/06027 370/400 |
| 2007/0016476 A1* | 1/2007 | Hoffberg | G05B 15/02 705/14.64 |
| 2007/0043731 A1* | 2/2007 | Wu | H04L 29/12009 |
| 2007/0087756 A1* | 4/2007 | Hoffberg | G06Q 10/0631 455/450 |
| 2007/0097959 A1* | 5/2007 | Taylor | G06F 21/10 370/352 |
| 2007/0139372 A1* | 6/2007 | Swanburg | G06F 3/0481 345/156 |
| 2007/0266439 A1* | 11/2007 | Kraft | H04L 63/083 726/26 |
| 2007/0299796 A1* | 12/2007 | Macbeth | G06Q 10/10 706/16 |
| 2008/0065574 A1* | 3/2008 | Hu | G06N 3/08 706/20 |
| 2008/0189360 A1 | 8/2008 | Kiley et al. | |
| 2008/0214157 A1 | 9/2008 | Ramer et al. | |
| 2008/0215709 A1* | 9/2008 | Kemp | H04L 67/40 709/219 |
| 2008/0227440 A1 | 9/2008 | Settepalli | |
| 2008/0268830 A1 | 10/2008 | Sharma et al. | |
| 2008/0293375 A1* | 11/2008 | Swanburg | H04M 11/002 455/405 |
| 2008/0313230 A1 | 12/2008 | Karaoguz et al. | |
| 2009/0061837 A1* | 3/2009 | Chaudhri | G06F 3/0481 455/418 |
| 2009/0132441 A1* | 5/2009 | Muller | H04N 7/163 706/11 |
| 2009/0138338 A1* | 5/2009 | Moukas | G06Q 10/0631 705/7.29 |
| 2009/0150514 A1 | 6/2009 | Davis et al. | |
| 2009/0197616 A1* | 8/2009 | Lewis | G06Q 30/02 455/456.1 |
| 2009/0234784 A1 | 9/2009 | Buriano et al. | |
| 2009/0248694 A1 | 10/2009 | Martinez et al. | |
| 2009/0254572 A1* | 10/2009 | Redlich | G06Q 10/06 |
| 2009/0281887 A1 | 11/2009 | Deakin et al. | |
| 2009/0281975 A1* | 11/2009 | Atallah | G06N 3/02 706/18 |
| 2009/0281997 A1 | 11/2009 | Jain | |
| 2010/0011299 A1* | 1/2010 | Brodersen | H04L 67/36 715/740 |
| 2010/0042647 A1* | 2/2010 | Schultz | H04L 12/1831 379/85 |
| 2010/0138370 A1 | 6/2010 | Wu et al. | |
| 2010/0150102 A1 | 6/2010 | Li et al. | |
| 2010/0162342 A1* | 6/2010 | Piepenbrink | H04N 7/17318 725/132 |
| 2010/0173628 A1 | 7/2010 | Hosain et al. | |
| 2010/0198939 A1* | 8/2010 | Raleigh | H04L 41/0806 709/217 |
| 2010/0257015 A1* | 10/2010 | Molander | G06Q 10/1097 705/7.21 |
| 2010/0278119 A1 | 11/2010 | Potkonjak | |
| 2010/0317420 A1* | 12/2010 | Hoffberg | G06Q 30/0207 463/1 |
| 2010/0332431 A1 | 12/2010 | Ribiere et al. | |
| 2011/0022312 A1 | 1/2011 | McDonough et al. | |
| 2011/0028138 A1* | 2/2011 | Davies-Moore | G06F 3/04817 455/418 |
| 2011/0034242 A1* | 2/2011 | Aronzon | A63F 13/10 463/29 |
| 2011/0083069 A1* | 4/2011 | Paul | G06F 8/60 715/234 |
| 2012/0221955 A1* | 8/2012 | Raleigh | H04M 15/00 715/736 |
| 2012/0233103 A1* | 9/2012 | Ashrafi | G06N 3/0436 706/16 |
| 2014/0180983 A1* | 6/2014 | Deng | G06N 3/02 706/15 |

FOREIGN PATENT DOCUMENTS

| | | |
|---|---|---|
| EP | 2003550 A1 | 12/2008 |
| GB | 2271486 A | 4/1994 |
| WO | 9511578 A1 | 4/1995 |
| WO | 9808314 A1 | 2/1998 |
| WO | 02086738 A1 | 10/2002 |
| WO | 2005039115 A1 | 4/2005 |
| WO | 2008125729 A1 | 10/2008 |
| WO | 2010127137 A1 | 11/2010 |

OTHER PUBLICATIONS

Xuemin Shen, "User mobility profile prediction: An adaptive fuzzy interference approach", 2000. http://www2.cs.science.cmu.ac.th/mscss/alumni/2548/documents/fuzzy_paper/12_p363-shen.pdf.
Richard Hull, Have it your way: Personalization of Network-Hosted Services, 2002. http://oz.stern.nyu.edu/seminar/fa02/0207paper.pdf.
M. Lankhorst, H. Van Kranenburg, A. Salden, and A. Peddemors. 2002. Enabling Technology for Personalizing Mobile Services. In Proceedings of the 35th Annual Hawaii International Conference on System Sciences(HICSS'02)—vol. 3—vol. 3 (HICSS'02), vol. 3. IEEE Computer Society, Washington, DC, USA, 87.2-. http://www.lab.novay.nl/~arjan/pub/hicss02-lankhorst.pdf.
Robbie Schaefer "Fuzzy Evaluation of User Profiles" Paderborn University/C-LAB, Fuerstenallee 11, Paderborn, Germany http://websrv2.c-lab.de/ubisec/publications/CHIWS04.pdf.
Stephen Lawson, "'Cisco Cultural Advisor' might help workers collaborate," ComputerWorld.com, Nov. 19, 2010; 03:25 PM ET; http://www.computerworld.com/s/article/9197439/_Cisco_Cult . . . .
K. Daniel, T. Tran, and C. Wietfeld, "IP-Based Overlay Signaling for Seamless Service Roaming in Heterogeneous Networks," Abstract; IEEE Xplore Digital Library, May 12, 2009.
S. Mohanty, "A new architecture for 3G and WLAN integration and inter-system handover management," Abstract; Published in: Wireless Networks, vol. 12, Issue 6 (Nov. 2006), pp. 733-745; ACM Portal, The Guide to Computing Literature.
J. O'Donovan and B. Smyth, "Trust in Recommender Systems," IUI'05, Jan. 9-12, 2005, San Diego, California, USA; pp. 167-174.
Quintero, A., "A user pattern learning strategy for managing users' mobility in UMTS networks," Abstract; IEEE Xplore Digital Library, Oct. 10, 2005.
R. Gellens, "Wireless Device Configuration (OTASP/OTAPA) via ACAP," The Internet Society; Jul. 1999.
N. Shenoy, "A framework for seamless roaming across heterogeneous next generation wireless networks," Published in: Wireless Networks, vol. 11, Issue 5, (Sep. 2005); retrieved from The ACM Guide to Computing Literature Digital Library.
M. Lankhorst, H. Van Kranenburg, A. Salden, and A. Peddemors. 2002. Enabling Technology for Personalizing Mobile Services. In Proceedings of the 35th Annual Hawaii International Conference on System Sciences (HICSS'02)—vol. 3—vol. 3 (HICSS '02), vol. 3. IEEE Computer Society, Washington, DC, USA, 87.2-. http://www.lab.novay.nl/~arjan/pub/hicss02-lankhorst.pdf.

(56) References Cited

OTHER PUBLICATIONS

Jani Mantyjarvi, "Adapting applications in handheld devices using fuzzy context information", 2003. http://people.sinclair.edu/kenbaker/Ken/handheld%20using%20fuzzy%20context-Seppanen.pdf.

Miika Valtonen, Antti-Matti Vainio, and Jukka Vanhala. 2009. Proactive and adaptive fuzzy profile control for mobile phones. In Proceedings of the 2009 IEEE International Conference on Pervasive Computing and Communications (PERCOM '09). IEEE Computer Society, Washington, DC, USA, 1-3. DOI=10.1109/PERCOM.2009.4912801 http://dx.doi.org/10.1109/PERCOM.2009.4912801 http://www.students.tut.fi/~valtone8/Proactive%20and%20Adaptive%20Fuzzy%20Profile%20Control.pdf.

* cited by examiner

US 9,424,509 B2

SYSTEM FOR APPLICATION PERSONALIZATION FOR A MOBILE DEVICE

TECHNICAL FIELD

The present invention relates to the operation of applications upon a mobile device, and more particularly, to a system and method for creating an adaptive personal profile for controlling presentation of applications upon a wireless mobile device.

BACKGROUND

As wireless device applications and wireless networks such as the 4G network continue to develop, a huge spectrum of applications are becoming available for end users to choose from. These applications provide the end users a wide variety of processes, abilities and solutions that may be sent to the user. This variety of applications are only useful to the end user when the applications are accessed and enabled to provide the end user with specific types of information they may require. Thus, some means for controlling the manner in which the information provided by the various applications could be presented to an end user would be of great interest and benefit to the end user. More particularly, the ability for a service provider to provide a service in which the manner the applications present information to an end user could be controlled in a manner beneficial to that user would provide a potential marketing benefit and revenue stream to the service provider. The service provider could provide this as a specialized service to the end user.

SUMMARY

The present invention, as disclosed and described herein, in one aspect thereof, comprises a system for controlling applications of a wireless mobile device. A network server receives data related to an adaptive user profile and controls operations of applications within the wireless mobile device. An adaptive neural net/fuzzy logic control application implemented within the network server generates the adaptive user profile responsive to the received data. The adaptive user profile controls the operation of the applications within the wireless mobile device and changes in real time responsive to changes in user behavior and profile.

BRIEF DESCRIPTION OF THE DRAWINGS

For a more complete understanding, reference is now made to the following description taken in conjunction with the accompanying Drawings in which.

DETAILED DESCRIPTION

Figure 1:
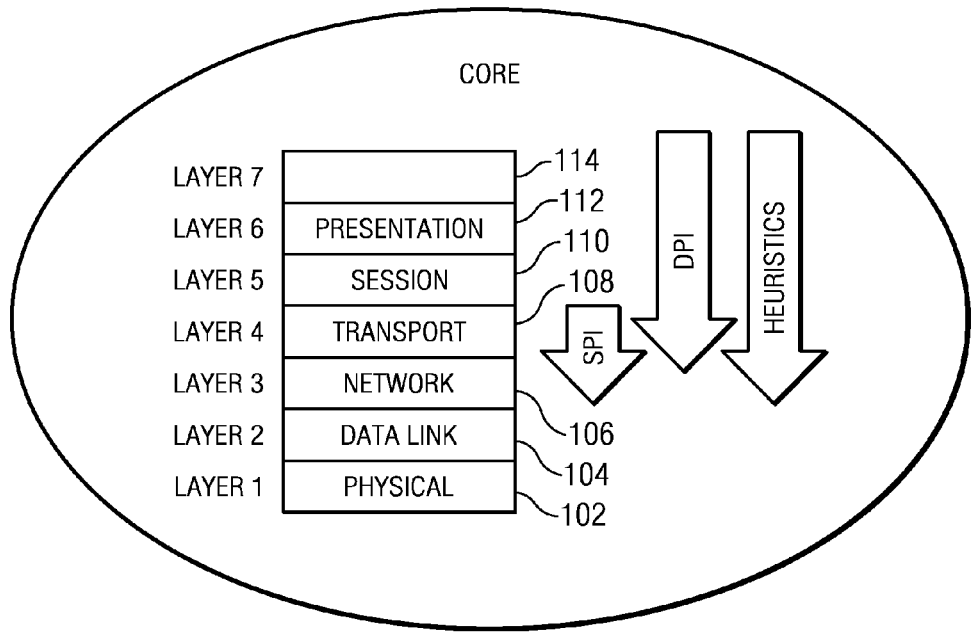
FIG. 1 illustrates the various control layers provided within a wireless network.

Referring now to the drawings, wherein like reference numbers are used herein to designate like elements throughout, the various views and embodiments of a system for application personalization for a mobile device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a drawing of the various control layers that are associated with providing a wireless connection to a portable wireless device. These include the physical layer 102, data link layer 104, network layer 106, the transport layer 108, the session layer 110, the presentation layer 112 and the application layer 114. Each of these seven layers together represents the open systems interconnection model (OSI model) for wireless networks. The OSI model is a manner for subdividing a communication system into the described seven layers. Each layer comprises a collection of conceptually similar functions that provide service to the layer above it and receives services from the layer below it. Within each layer, an instance provides services to the instances at the layer above and requests services from the layers below.

The physical layer 102 defines the electrical and physical specifications for devices providing the wireless communications. It defines the relationship between a device and its transmission medium. The physical layer 102 provides the media signal and binary transmission requirements for the wireless communication system. The physical layer 102 provides for the establishment and termination of a connection to a communications medium, provides for the participation in the process whereby communications resources are effectively shared amongst multiple users. The physical layer 102 also provides for modulation or conversion between the representation of digital data and user equipment and corresponding signals transmitted over a communications channel.

The data link layer 104 provides the functional and procedural means to transfer data between network entities and to detect and correct errors that may occur within the physical layer 102. Thus, the data link layer 104 enables for communications between various devices of the communications network. The data link layer 104 provides for point-to-point and point-to-multi-point communications in the wireless network. The data link layer 104 combines the bit data received from the physical layer 102 into frames for transmission to the network layer 106.

The network layer 106 enables for path determination and logical addressing within the wireless network. The network layer 106 provides the functional and procedural means of transferring variable length data sequences from a source to a destination via the wireless network while maintaining the quality of service requested by the transport layer 108. The network layer 106 performs network routing functions and may also perform fragmentation and reassembly of data packets that are generated from frames received from the data link layer 104. The network layer 106 also reports delivery errors between network components. Routers operate within the network layer 106 enabling the transmission of data between nodes of the wireless network.

The transport layer 108 provides transparent transfer of data between end users and provides reliable data transfer services to the higher data layers. The transport layer 108 controls the reliability of a given communications link through flow control, segmentation/de-segmentation and error control. Some protocols are state and connection oriented. The transport layer 108 can track segments transmitted over a communication link and re-transmit those that fail. The transport layer 108 also provides acknowledgments of successful data transmissions and sends a next group of data if no errors have occurred.

The session layer 110 controls the connections between various computers and nodes of the wireless communication network. The session layer 110 establishes, manages and terminates the connections between local and remote applications. The session layer 110 provides full duplex, half duplex or simplex operations and establishes check pointing, adjournment, termination and restart procedures for the network. The session layer 110 is responsible for closing communication sessions and for session check pointing and recovery.

The presentation layer 112 establishes context between application layer 114 entities in which the higher layer entities may use different syntax and semantics if the presentation service provides a mapping between them. If mapping is available, presentation service data units are encapsulated into session protocol data units and passed down the stack. The presentation layer 112 provides independence from data representation (e.g., encryption) by translating between applications within the application layer and network formats. The presentation layer 112 transforms data into a form that applications within the application layer will accept. The presentation layer formats and encrypts data to be sent across the network.

The application layer 114 is the layer closest to the end user which means that the application layer and the user interact directly with a software application. The application layer 114 interacts with software applications that implement a communicating component. Such application programs fall outside the scope of the OSI model. Application layer functions typically include identifying communication partners, determining resource availability and synchronizing communications. When identifying communication partners, the application layer 114 determines the identity and availability of communication partners for applications with data to transmit. When determining resource availability, the application layer 114 decides whether sufficient network resources for the requested communication exist. In synchronizing communications, all communications between applications requires cooperation that is managed by the application layer 114. The application layer 114 is used for controlling the information, which is presented to the user such as applications like their user interface. By providing some manner for controlling the information presented from the application layer 114 to the various applications of the control of the application layer 114, a user can be provided with a more valuable content experience, and if the system provider can control the manner in which the applications are being presented to the user, they are providing their customers with a benefit that can create revenue generating capabilities for the system provider.

Figure 2:
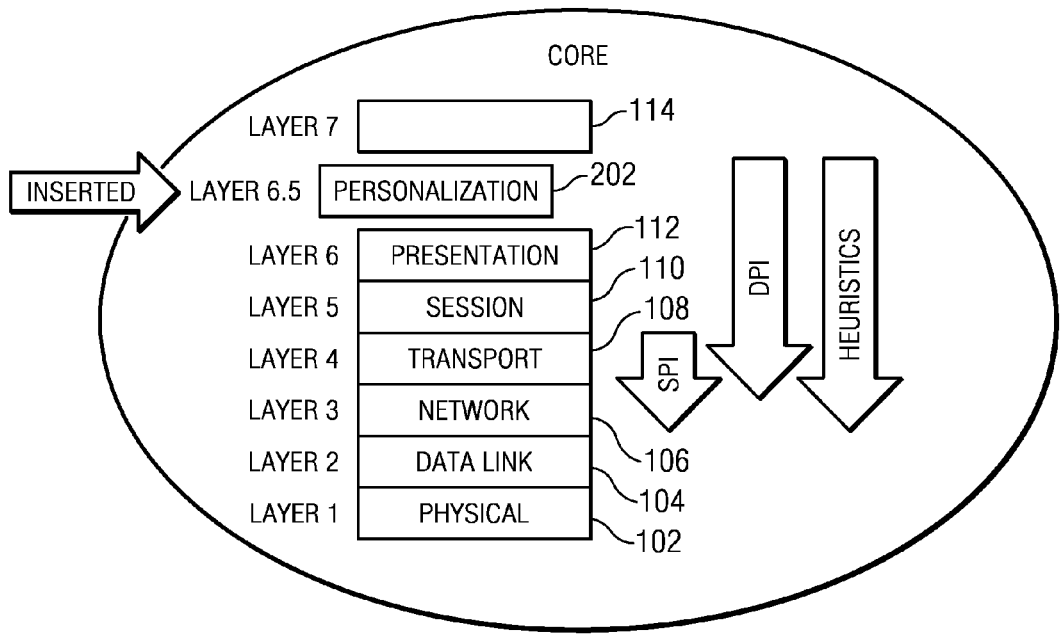
FIG. 2 illustrates the additional personalization layer that may be inserted within the wireless protocol layer stack.

Referring now to FIG. 2, there is illustrated an implementation of the current invention wherein a personalization layer 202 is inserted between the application layer 114 and the presentation layer 112. The personalization layer 202 will extract data from the number of different sources as described hereinbelow to enable the creation of an adaptive user profile. The adaptive user profile enables control of applications within the application layer 114 in a way that is unique to each user. A personalization layer 202 will allow the presentation of information to a user that is unique and of interest to the user without any interaction or input by the user. The personalization layer 202 obtains and compiles all of the information as more fully described hereinbelow to enable the generation of the adaptive user profile and utilizes the adaptive user profile to control the initiation and presentation of the applications within the application layer 114 to present user specific information that is most likely to be of interest and use to the user of a wireless mobile device.

Figure 3:
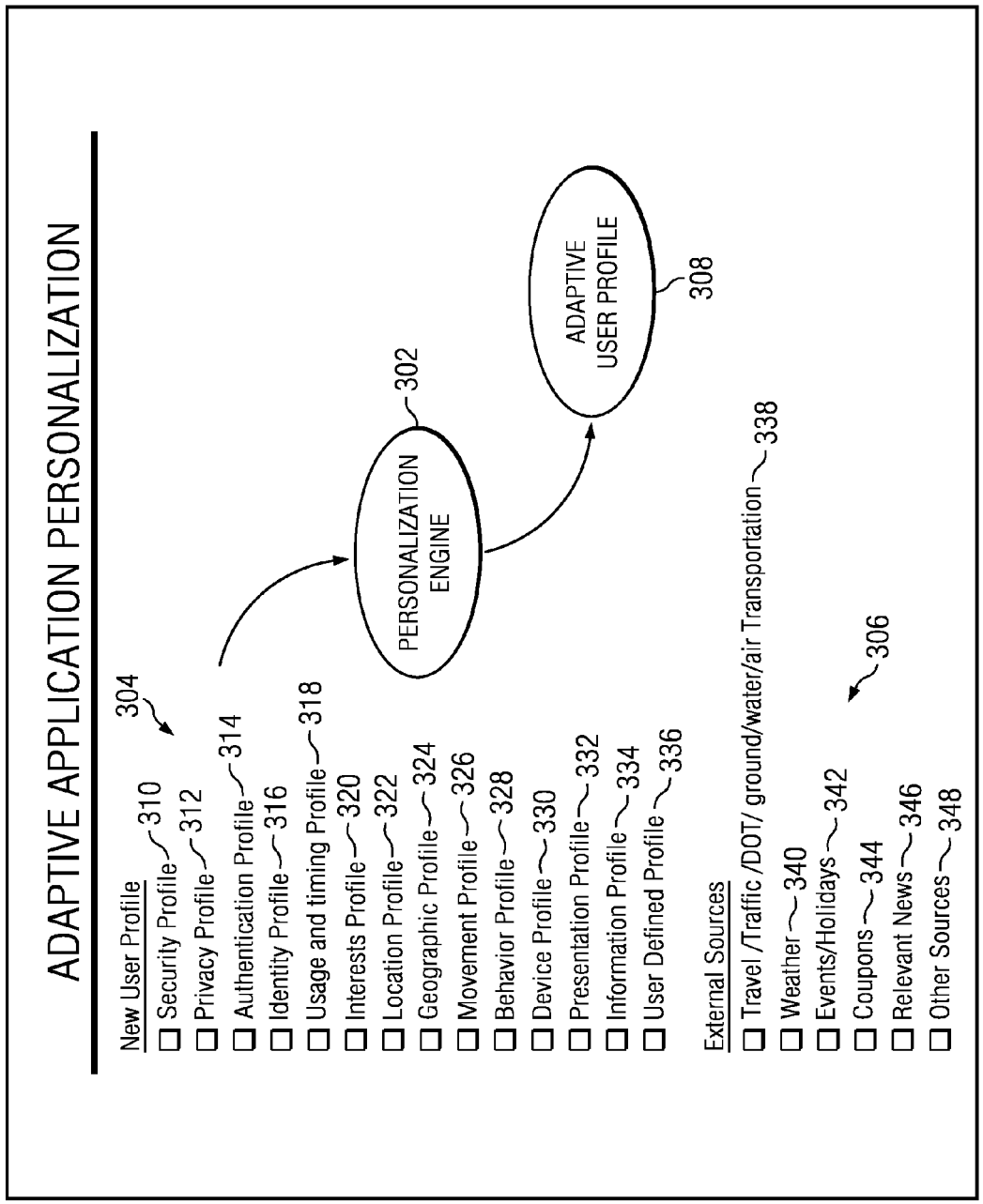
FIG. 3 illustrates the manner in which various user profile information and external information may be combined within a personalization engine to provide an adaptive personalized user interface.

Referring now to FIG. 3, there is illustrated a manner in which a personalization engine 302 may utilize a number of user profiles 304 and external sources 306 to generate the adaptive user profile that is personalized to a particular user. A security profile 310 defines the security information that is associated with a particular user profile 308. This can include information such as passwords, user IDs and other types of security information that allows an individual to log onto and access various types of online information. A privacy profile 312 provides information that should not be disclosed with respect to the user profile 308. The privacy profile 312 identifies certain types of information that a user desires to maintain in private and not to be shared with third party individuals. The authentication profile 314 contains user passwords and IDs that are necessary for authenticating the user profile within various applications within the application layer 114.

An identity profile 316 contains identification information with respect to a particular user and user profile. This could contain information such as the user's name, age, birth date and any other type of information that is necessary for confirming or providing an identity of a user or information with respect to the user's identity. The usage and timing profile 318 stores and provides information with respect to amounts and time of usage by a user of particular applications or other types of services with respect to their mobile device. The usage and timing profile 318 stores in a central location all of the time-based usage information and times that these usages occurred so that they may be accessed by the personalization engine for generation of the adaptive user profile 308.

The interest profile 320 stores information relating to the interest of a user. The interest profile includes user-entered information such as interest in particular activity, hobby, television shows, movies, types of music, etc. The interest profile 320 additionally includes information that is data mined from user choices made with respect to their mobile wireless device such as visited websites, music or information downloaded to the handset or numbers contacted through the mobile device.

A location profile 322 stores information with respect to the present and past actual locations of the mobile device such as a specific restaurant, movie theater, bookstore, shop, etc. The geographic profile 324 provides information with respect to the geographic position of the mobile device with information such as the city, state country in which you are located and the positions that the mobile device travels to within the city. The movement profile 326 provides information with respect to movements of the mobile device at particular points in time. The movement information can be indexed and associated with particular times of the day, week, month, year, etc., in order to allow future determinations of possible movement characteristics to be made from past movement profiles.

The behavior profile 328 includes information with respect to particular behaviors of the user associated with the adaptive user profile 308. This behavior profile information can include details with respect to a users actions with respect to use of the voice and data features of the mobile device, such as downloading 5 minutes of video only to watch the first 10 seconds, click patterns when accessing the web, etc. The device profile 330 contains information describing the characteristics and parameters of the mobile device in which the adaptive user profile 308 is implemented and with respect to the various applications that are installed and utilized within the mobile device. The presentation profile 332 provides information with respect to the manner a user likes to view information on the mobile device, such as using high definition HD, resolution if User Equipment (UE) supports this format. The information profile 334 includes information in which the user has an interest. Finally, the user-defined profile 336, which is stored on a secure cloud, enables the user to enter various types of information that are specific to a user's desires, wants and needs that will affect the operation of the personalization engine 302 and the generation of the adaptive user profile.

The external sources 306 comprise various sources that are accessed via the Internet that provide information that is useful in the personalization engine 302 generating the adaptive user profile 308 for controlling the applications within a mobile device. External sources 306 include information such as travel information, traffic information, and ground/water/air transportation information 338 that may be accessed over the Internet. This type of travel information can be useful in determining positioning movement or travel decisions with respect to the mobile device by providing up-to-date current travel/traffic/transportation information to the mobile device. Weather information 340 may be used to provide current weather information to the mobile device. Event/holiday information 342 can be in the form of a calendar type functionality that enables determination of particular unique events, such as birthdays, anniversaries, etc., the occurrence of major holidays, such as Thanksgiving, Christmas, New Years, etc or generic events (i.e. Valentines Day, St. Patrick's Day, etc.).

Coupon information 344 stores information with respect to coupons of retailers or sellers with which a particular user may have some type of predefined relationship. In the appropriate situation new coupon information 344 may be retrieved and presented through the adaptive user profile 308 on a mobile device such that a user may take advantage of various coupons that may be available to them of which they were not aware. Relevant news information 346 can be presented from various news websites such as Fox News, MSNBC, CNN, Yahoo!, Google, etc., that provides news information to a user based upon that user's particular interest. Thus, for example, if a user was particularly interested in the stock market, various stock increases or decreases could be obtained from these websites and provided to the user automatically. Finally, various other types of information sources 348 may be utilized based upon the type of information that is needed to implement particular information to a user through the applications of the mobile device as required by the operation of the adaptive user profile 308.

Figure 4:
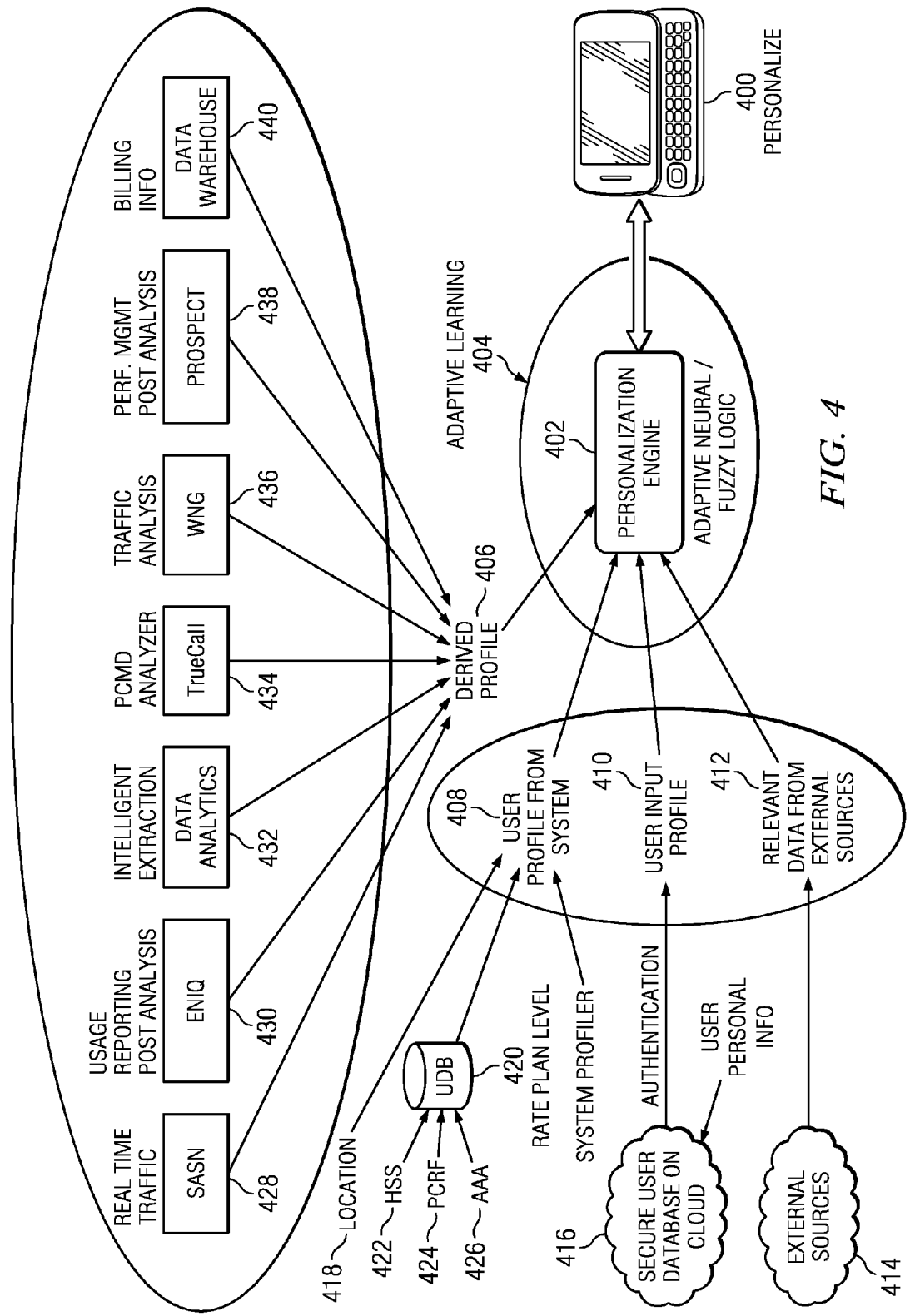
FIG. 4 illustrates the manner in which the personalization engine may combine a variety of data to present a personalized user profile within a wireless mobile device.

Referring now to FIG. 4, there is provided a more detailed implementation of the personalization engine 402 and the manner in which it generates the adaptive user profile for use within a wireless mobile device 400. The personalization engine 402 utilizes an adaptive neural net/fuzzy logic network 404. The adaptive neural net/fuzzy logic network 404 obtains information from a number of different sources including derived profiles 406, user profiles from the wireless network system 408, user input profiles 410 and external data sources 412. The derived profiles 406 come from a number of different sources as will be described further hereinbelow that mine particular types of data from existing sources in order to generate the derived profile 406 information. The user profiles 408 comprise information that is obtained from the system that is providing the wireless network services to the wireless mobile device 406. User input profiles 410 comprise information that the user has created to assist the personalization engine 402 in generating the adaptive user profiles for controlling their wireless mobile device 400. The relevant data from external data sources 412 comprise various types of information that may be necessary for the personalization engine 402 to generate the adaptive user profile such as traffic sources, weather information, etc., as described previously with respect to FIG. 3.

The external data sources 412 obtain the relevant data from various external sources 414 that provide information to the personalization engine 402 such as traffic information, weather information, news, coupons, or events and holidays as discussed hereinabove. The external sources 414 are accessed and provide information, as necessary, depending upon particular applications that are being actuated by the user profile generated by the personalization engine 402.

The user input profiles 410 are provided from a secure user database 416 on a user secure cloud network. The secure user database 416 is accessed through the user cloud by the user in a private fashion that allows the user to enter any information they desire to affect the generation of their adaptive user profile by the personalization engine 402. Before accessing the secure user database, the user input profile 410 must provide some type of authentication process between the user input profile and the secure user database 416 in order to access the secure user database by authorized users and limit unwanted usage of the information within the secure user database.

User profiles 408 from the system come from the wireless system provider for use by the personalization engine 402. This type of system user profile 408 may include location information 418 or information that is provided from the UDB (unified database) 420 that collects information from the home subscriber server (HSS) 422, policy charging and rules function (PCRF) 424 and the AAA (Authentication, Authorization and Accounting) 426. The user database 420 stores user system information from each of the described sources. The HSS 422 is a master user database that supports network components that are handling wireless calls. The HSS 422 contains subscription related information (subscriber profiles) that includes information relating to users making or receiving calls and their subscription levels. The HSS 422 additionally performs authentication and authorization of users for the network and can provide information relating to a subscriber's location and IP information. The PCRF 424 determines the policy rules associated with a multimedia network. The PCRF 424 plays a central role in next generation networks. The PCRF 424 assesses subscriber databases and other specialized functions such as charging systems and provides this information to the user database 420. The PCRF 424 obtains and provides quality of service and traffic policy information to the user database 420.

The AAA 426 comprises the traditional Authentication, Authorization and Accounting. The AAA 426 is responsible for authentication and authorizing access to the wireless network. The AAA 426 also performs accounting functions with respect to the usage of the mobile device on the wireless network.

The derived profile 406 comprises information that is derived from various sources such that different types of information that are useful for the personalization engine 402 to create the adaptive user profile may be used. Various examples of these types of nodes or functions for determining information for the derived profile are illustrated in FIG. 4. However, other types of functions or nodes may also be utilized to create derived profile 406 information. The SASN (service aware support node) 428 is used for generating real time traffic information for storage in the derived profile 406. The service aware support node 428 is a tool for traffic inspection in multi-vendor multi-accessed networks. SASNs 428 main application is enforcement of policy control and charging in mobile broadband networks. The capabilities of the SASN 428 include traffic inspection for a wide range of protocols, policy enforcement, advanced traffic management, content filtering and insertion, collection of statistics, support for real time charging and support for post-paid and pre-paid users.

The ENIQ (Ericsson Network Intelligence Quotient) 432 is a data mining and reporting system for networks that may be used to obtain usage information, reporting information, and post analysis information. The ENIQ 432 collects statistics from network elements, loads them into a database and provides reports on network quality based on KPIs (Key Performance Indicators). This information may be provided to the derived profile 406.

The data analytics 432 provides intelligent extraction information to the derived profile 406. Data analytics 432 enable data analysis for usage and charging within the wireless network. TrueCall 434 provides a PCMD (Per Call Mobile Data) analyzer. TrueCall provides real-time network performance data specific to particular locations (Lat, Long) within the wireless network. The WNG (Wireless Network Guardian) 436 provides traffic analysis over the network. Prospect 438 comprises a performance and service management system that may provide performance management and post analysis information to the derived profile 406. Prospect 438 is a client service architecture application that delivers performance metrics and makes it simple to generate performance reports for use across the enterprise. A data warehouse 440 stores various types of information with respect to the network that may be utilized by the derived profile 406. The data warehouse 440 stores information such as billing information that is relevant to the implementation of various applications by the adaptive personal profile.

The personalization engine 402 utilizes the adaptive neural net/fuzzy logic algorithm for generating the adaptive user profile from the derived profile information 406, the system user profile 408, the user input profile information 410 and the relevant data from external data sources 312. Each of these pieces of information enable the creation of an adaptive user profile for controlling applications on an application layer of the mobile device 400 to create a personalized user interface for the user of the wireless mobile device 400.

Thus, the personalization engine 402 enables a network provider to tap into data collected from eNBs, CPGs, MME, OSS, SASN, ENIQ, data warehouses as well as external solutions like TrueCall to identify the location of the subscriber, their usage patterns and various applications which they may use. Additionally, the personalization engine enables the network to determine the times that they use their applications and other types of information that are specific to the individual end user. This information is utilized to create a unique adaptive user profile that is specific to that user and will provide a great deal of benefits when applied to the mobile device of that user such that their applications are being generated in a unique fashion considered to present information and relevancy to the user in which they would be most interested.

The created profiles may be provided from the personalization engine 402 as a for pay service. Thus, a service provider may charge a user for use of the profile to create a revenue stream for the network service provider.

Figure 5:
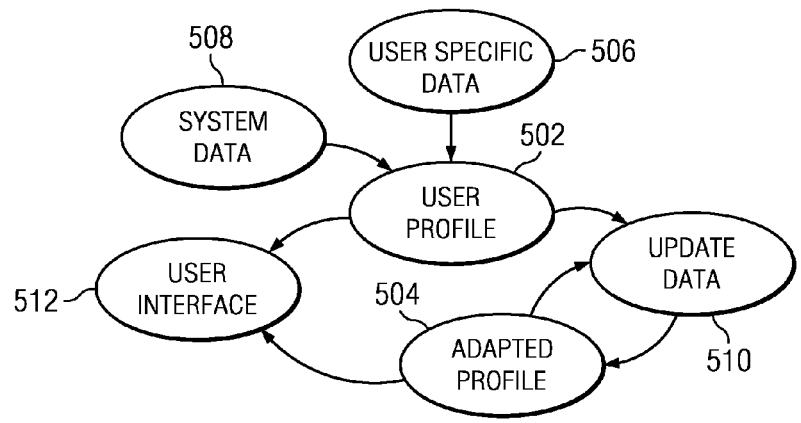
FIG. 5 illustrates the manner in which the user profiles are created, updated and used to control a user interface.

Referring now to FIG. 5, there is illustrated the manner in which the personalization engine 302 generates the user profile 502 and adaptive user profile 504 in accordance with the provided data as described in FIG. 4. The user profile 502 receives user specific data 506 and system data 508 from the variety of sources discussed hereinabove. The user specific data 506 comprises data that is particular to the user associated with the user profile 502. This includes information such as calling habits, interests, present location, etc. The system data 508 comprises general information that may possibly affect the user of the mobile device in some manner. This could include information such as present call traffic, various types of connection information, weather data, traffic data or any other type of general or system-type information that may affect the user and be of benefit to determining control of their application profile.

After the user profile 502 is created, the profile is monitored to determine when either the user-specific data 506 or system data 508 has updated data 510 for insertion into the profile. When updated data 510 is located, the profile 502 is updated at 504 to reflect the information provided by the updated data 510 and returns to monitor for updated data 510. The adaptive profile 504 and/or user profile 502 are used for controlling the user interface 512 of the wireless mobile device. In this manner, the user interface is adaptively controlled via the adaptive user profile 504 in order to present information to the user that is uniquely associated with or of interest to the user.

Figure 6:
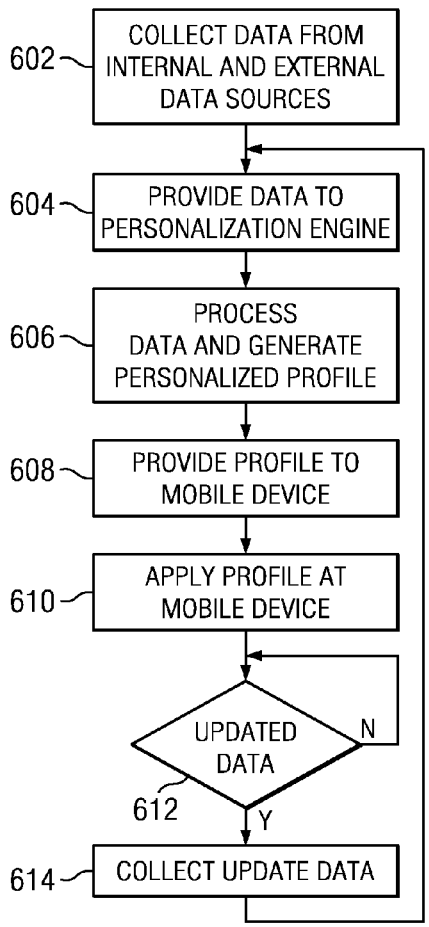
FIG. 6 is a flow diagram describing the operation of the system of FIG. 4.

Referring now to FIG. 6, there is illustrated a flow diagram describing the process by which the adaptive user profile may be created to control an interface of a wireless mobile device. Data is initially collected from various internal and external data sources at step 602. As described previously, this data may relate to user-specific information associated with the user of the mobile device or may comprise general information relating to the connection associated with the mobile device or local options and information that may affect the user of the mobile device. The collected data is provided to the personalization engine 302 such that the adaptive neural net/fuzzy logic network may process the data in order to create the personalized profile at step 604.

The adaptive neural net/fuzzy logic network 404 processes at step 606 the provided data to generate the personalized profile. This personalized profile is provided at step 608 from the network to an associated mobile device. The provided profile is applied to the mobile device at step 610 such that a personalized interface is provided to a user through the mobile device responsive to the generated adaptive user interface created by the personalization engine 302. Inquiry step 612 determines if any information has been provided to the personalization engine to update the user profile and if not, continues to monitor for updated data at inquiry step 612. If newly updated data is detected by inquiry step 612, the updated data is collected at step 614 and provided to the personalization engine at step 604 to adaptively update the adaptive user profile being generated by the personalization engine 302.

Figure 7:
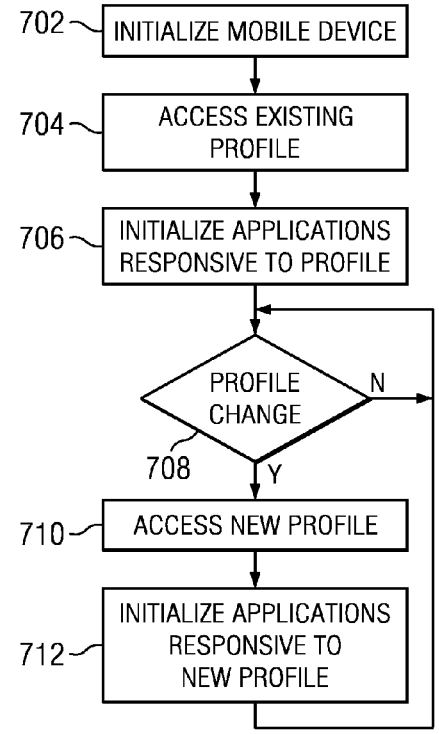
FIG. 7 is a flow diagram describing the manner in which applications within a wireless device are controlled using the adaptive user profile.

Referring now to FIG. 7, there is illustrated the process for utilizing the adaptive user interface provided to a mobile device. When a mobile device is initialized at step 702, it will access its existing user profile at step 704 that is already stored locally within the mobile device. Using the presently existing user profile at step 706, the mobile device begins to initialize applications responsive to the presently stored profile within the mobile device. Inquiry step 708 monitors for changes within the existing profile and when no changes are detected will continue to monitor for received profile changes. Once a profile change is detected by inquiry step 708, the new profile is accessed at step 710 and new applications that may be initialized responsive to the new profile are initiated at step 712. Control passes back to step 708 where the mobile device will continue to monitor for additional profile changes that may cause changes within the presented applications.

It will be appreciated by those skilled in the art having the benefit of this disclosure that this system for application personalization for a mobile device provides an improved interface particularly formatted to the needs of a particular user. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for controlling icons for launching applications displayed within a user interface of a wireless mobile device, comprising:

a network computer server for receiving data related to an adaptive user profile that controls launching of applications implemented on an application layer of the wireless mobile device that have an icon displayed in the user interface of the wireless mobile device and that presents at least a portion of the received data in the launched applications within the user interface of the wireless mobile device located remotely from the network computer server, wherein the adaptive user profile controls which of the applications implemented on the application layer of the wireless mobile device that have the icon displayed in the user interface of the wireless mobile device are launched within the user interface of the wireless mobile device and presents the portion of the received data in the launched applications in the user interface in real time responsive to the received data;

an adaptive neural net/fuzzy logic control application implemented within the network computer server for generating the adaptive user profile controlling the launching of applications implemented on the application layer of the wireless mobile device that have the icon displayed in the user interface of the wireless mobile device and the presentation of at least a portion of the received data in the launched applications within the user interface of the remotely located mobile device responsive to the received data, wherein the received data comprises derived profile data, the derived profile data extracted from a plurality of sources that analyze operations of the wireless mobile device with respect to the wireless network, the plurality of sources comprising a SASN (support aware service node), an ENIQ (Ericsson Network Intelligence Quotient) system, a data analytics node, a per call mobile data analyzer, a WNG (Wireless Network Guardian), a client service architecture application, and a data warehouse; and wherein the network computer server forwards the adaptive user profile to the wireless mobile device and forwards updated adaptive user profiles as the updated adaptive user profiles become available.

2. The system of claim 1, wherein the received data comprises user profile data provided from a wireless network provider specific to the wireless device user.

3. The system of claim 1, wherein the received data further comprises input user data that has been entered by the user.

4. The system of claim 3 further including a secure user database on a cloud for storing the input user data provided by a user.

5. The system of claim 1, wherein the received data comprises external data from non-wireless network system related sources.

6. The system of claim 1, wherein the adaptive neural net/fuzzy logic control application generates a plurality of adaptive user profiles each of the plurality of adaptive user profiles uniquely associated with a particular wireless mobile device.

7. The system of claim 1, wherein the adaptive user profile is provided to a user of the wireless mobile device from a network side as a pay service.

8. The system of claim 1, wherein control of the network server and the adaptive neural net/fuzzy logic control application are controlled within a personalization control layer implemented between an application control layer and a presentation control layer.

9. A system for controlling icons for launching applications displayed within a user interface of a wireless mobile device, comprising:

a network computer server for receiving data related to an adaptive user profile that controls launching of non-advertising related applications implemented on an application layer of the wireless mobile device that have an icon displayed in the user interface of the wireless mobile device and controls presentation of at least a portion of the received data in the launched non-advertising related applications implemented on an application layer of the wireless mobile device that have the icon displayed in the user interface of the wireless mobile device within the user interface of the wireless mobile device located remotely from the network computer server, wherein the adaptive user profile controls which of the non-advertising related applications implemented on the application layer of the wireless mobile device that have the icon displayed in the user interface of the wireless mobile device launched within the user interface of the wireless mobile device and presents the portion of the received data in the launched non-advertising related applications implemented on an application layer of the wireless mobile device that have the icon displayed in the user interface of the wireless mobile device in the user interface in real time responsive to the received data, the received data comprising user profile data provided from a wireless network provider specific to the wireless device user, derived profile data extracted from a plurality of sources that analyze operations of the wireless mobile device with respect to the wireless network and input user data that has been entered by the user, the plurality of sources comprising a SASN (support aware service node), an ENIQ (Ericsson Network Intelligence Quotient) system, a data analytics node, a per call mobile data analyzer, a WNG (Wireless Network Guardian), a client service architecture application, and a data warehouse;

an adaptive neural net/fuzzy logic control application implemented within the network computer server for generating the adaptive user profile controlling the launching of the non-advertising related applications implemented on the application layer of the wireless mobile device that have the icon displayed in the user interface of the wireless mobile device and controls presentation of at least a portion of the received data in the launched non-advertising related applications implemented on the application layer of the wireless mobile device that have the icon displayed in the user interface of the wireless mobile device within the user interface of the remotely located mobile device responsive to the received data; and wherein the network computer server forwards the adaptive user profile to the wireless mobile device and forwards updated adaptive user profiles as the updated adaptive user profiles become available.

10. The system of claim 9 further including a secure user database for storing the input user data provided by a user.

11. The system of claim 9, wherein the received data comprises external data from non-wireless network system related sources.

12. The system of claim 9, wherein the adaptive user profile is provided to a user of the wireless mobile device from a network side as a pay service.

13. The system of claim 9, wherein control of the network server and the adaptive neural net/fuzzy logic control application are controlled within a personalization control layer implemented between an application control layer and a presentation control layer.

14. A method for controlling icons for launching of applications displayed within a user interface of a wireless mobile device, comprising:

receiving data related to an adaptive user profile at a network computer server, the received data comprising derived profile data extracted from a plurality of sources that analyze operations of the wireless mobile device with respect to the wireless network, the plurality of sources comprising a SASN (support aware service node), an ENIQ (Ericsson Network Intelligence Quotient) system, a data analytics node, a per call mobile data analyzer, a WNG (Wireless Network Guardian), a client service architecture application, and a data warehouse;

generating the adaptive user profile responsive to the received data at a network server, the adaptive user profile controlling launching of applications implemented on an application layer of the wireless mobile device that have an icon displayed in the user interface of the wireless mobile device and controlling presentation of at least a portion of the received data in the launched applications within a user interface of a remotely located wireless mobile device;

changing the adaptive user profile in real time responsive to the received data at a network server to create an updated adaptive user profile;

transmitting the updated adaptive user profile to the remotely located wireless mobile device as the updated adaptive user profile becomes available; and controlling the launching of applications implemented on the application layer of the wireless mobile device that have the icon displayed in the user interface of the wireless mobile device and presentation of at least a portion of the received data in the launched applications within the user interface of the remotely located wireless mobile device responsive to the adaptive user profile.

15. The method of claim 14, wherein the step of generating further comprises the step of generating the adaptive user profile responsive to user profile data provided from a wireless network provider specific to the wireless device user.

16. The method of claim 14, wherein the step of generating further comprises the step of generating the adaptive user profile responsive to derived profile data extracted from a plurality of sources that analyze operations of the mobile device with respect to the wireless network.

17. The method of claim 14, wherein the step of generating further comprises the step of generating the adaptive user profile responsive to input user data that has been entered by the user.

18. The method of claim 14, wherein the step of generating further comprises the step of generating the adaptive user profile responsive to external data from non-wireless network system related sources.

19. The method of claim 14, wherein the step of controlling further comprises the step of updating the adaptive user profile in real time responsive to the received data.

20. The method of claim 14 further comprising the step of providing the adaptive user profile to a user of the wireless mobile device from a network side as a pay service.

* * * * *